C. H. SMITH.
Trace-Carrier.

No. 214,204.  Patented April 8, 1879.

Witnesses.  Chas. H. Smith
Inventor
By Atty.

UNITED STATES PATENT OFFICE.

CHARLES H. SMITH, OF NEW HAVEN, CONNECTICUT, ASSIGNOR TO O. B. NORTH & CO., OF SAME PLACE.

IMPROVEMENT IN TRACE-CARRIERS.

Specification forming part of Letters Patent No. 214,204, dated April 8, 1879; application filed February 3, 1879.

*To all whom it may concern:*

Be it known that I, CHARLES H. SMITH, of New Haven, in the county of New Haven and State of Connecticut, have invented a new Improvement in Trace-Carriers; and I do hereby declare the following, when taken in connection with the accompanying drawings and the letters of reference marked thereon, to be a full, clear, and exact description of the same, which said drawings constitute part of this specification, and represent, in—

Figure 1:
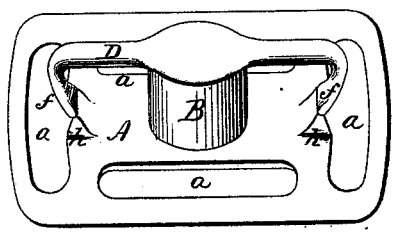
Figure 2:
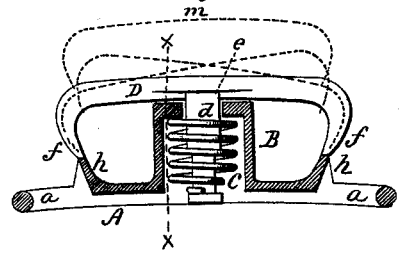
Figure 3:
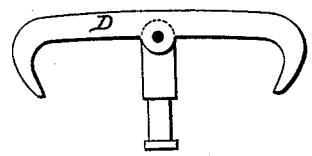

Figure 1, a perspective view; Fig. 2, a longitudinal central section; Fig. 3, a modification; and in Fig. 4, a transverse section on line $x$ $x$ of Fig. 2.

This invention relates to an improvement in the device used in harness for horses for the purpose of holding the ends of the traces when not engaged with the carriage, and commonly called "trace-carriers;" and it consists in the construction hereinafter described, and more particularly recited in the claims.

A is the base, constructed for attachment to the back-straps by the loops $a$ or otherwise. In the center of the base is the vertical support B. This is preferably of tubular form, open from the bottom, and partially closed at the top, and so as to contain the spring C, which takes its bearing upon the under side of the partially-closed top.

Figure 4:
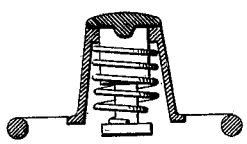

D is a bar across the top of the support B, and provided with a central projection, $d$, which extends down through the opening $e$ in the upper end or top of the support B and through the spring C; and below the spring a collar or other bearing is provided on the projection $d$ for the lower end of the spring, so that the tendency of the spring is to hold the bar D down upon the top of the support B, but allows the bar to be raised as occasion requires. The opening through the top of the support is oblong, and the projection $d$ of corresponding shape; but the opening is large enough to allow one end only of the bar to be raised, as indicated in broken lines, Fig. 2, and longitudinally across the top of the support B is a groove or notch, into which the bar falls when left free, and which serves to retain the bar in its proper position longitudinally, as seen in Fig. 4.

Each end of the bar is turned downward in hook shape, as shown at $f$, and so as to meet a corresponding projection, $h$, on the base. The outer surface of the hook-shaped ends is curved inward, so that when the cockeye is pressed against it it will rise and allow the cockeye to pass in. Then the bar will close and secure the cockeye; or the bar may be raised vertically, as seen in broken lines $m$, Fig. 2, and both cockeyes simultaneously introduced or released.

Instead of allowing the play of the projection $d$ in the support, the projection $d$ may be fitted and guided vertically, and the bar D pivoted thereto, as seen in Fig. 3.

The support B need not of necessity be tubular in form, as it may be open—that is, it may consist of a simple post or two posts, with a connection across the top, through which the projection $d$ will pass.

It will be evident that another kind or arrangement of spring may be applied without departing from this invention.

I am aware that trace-carriers have been made with hooks hinged at the center, and so as to open and close in a vertical plane, and therefore do not broadly claim such device.

I claim—

1. In a trace-carrier, the combination of the base and central support with a spring and a cross-bar, the projection $d$ of which is arranged in said central support as a guide for said bar, and so as to permit the bar to be raised bodily or at either end, substantially as described.

2. The combination, in a trace-carrier, of the base and central support with a spring and a cross-bar, the tail-piece of which is arranged in said central support, so as to permit the bar to be raised bodily or at either end, and a groove or notches in the upper surface of said central support, as a rest to hold the said bar when closed, substantially as described.

CHARLES H. SMITH.

Witnesses:
J. H. SHUMWAY,
JOS. C. EARLE.